Patented Nov. 25, 1941

2,263,757

UNITED STATES PATENT OFFICE 2,263,757

KETONE DYE AND PROCESS FOR PREPARING IT

Leslie G. S. Brooker and Frank L. White, Rochester, N. Y., assignors to Eastman Kodak Company, Rochester, N. Y., a corporation of New Jersey No Drawing. Application December 16, 1937,
Serial No. 180,215

13 Claims. (Cl. 260—240)

This invention relates to ketone dyes which can be called merocarbocyanine dyes and to a process for preparing the same. More particularly, this invention relates to chain-substituted merocarbocyanine dyes and to a process for preparing the same. Such new dyes are of particular utility in the preparation of sensitized photographic emulsions as described in our copending application Serial No. 95,931, filed August 13, 1936, of which the instant application is a continuation-in-part. Said application Serial No. 95,931 issued as United States Patent No. 2,165,338 on July 11, 1939.

The dyes of our invention can be represented by the following general formula:

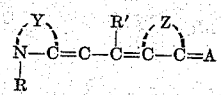

wherein A represents an atom, such as oxygen or sulfur, R represents an organic residue, such as an alkyl group, for example methyl, ethyl, isobutyl, allyl, β-ethoxyethyl, β-carbethoxyethyl or benzyl, R' represents an organic residue, such as an alkyl or aryl group, for example methyl, n-butyl, allyl, benzyl, phenyl or furyl, Y represents the non-metallic atoms necessary to complete an arylothiazole or aryloselenazole nucleus, such as benzothiazole, 4-chloro-benzothiazole, α- or β-naphthothiazole or benzoselenazole for example and Z represents the non-metallic atoms necessary to complete a five-membered or six-membered heterocyclic nucleus, such as rhodanine, 3-alkylrhodanines, 2-thio-2,4(3,5)-oxazolediones and thiobarbituric acids for example.

The dyes of our invention can be prepared by condensing an acylmethylene, other than a formylmethylene, derivative of an arylothiazoline or an aryloselenazoline compound with a heterocyclic compound containing a nuclear reactive methylene group, such as a heterocyclic compound containing a nuclear reactive methylene group adjacent to a nuclear carbonyl or thiocarbonyl group for example. The condensations can be carried out by merely heating the reactants together but are advantageously effected in the presence of a water-binding agent. Water-binding agents which we have found particularly advantageous are organic acid anhydrides such as acetic, propionic or butyric anhydrides for example.

The formation of one of our new dyes can be illustrated by depicting the condensation of 1-acetylmethylene-2-ethylbenzothiazoline with barbituric acid, in the presence of acetic anhydride:

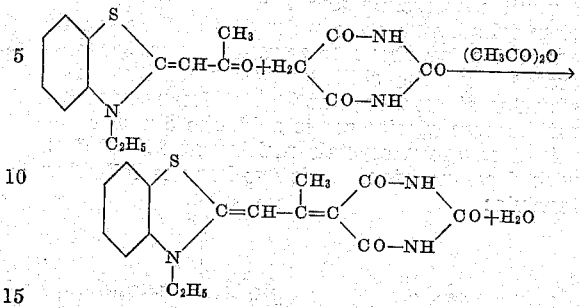

While the process of preparing our new ketone dyes is subject to variation particularly as respects the nature and quantity of the arylothiazoline or arylselenazoline compound employed, the nature and quantity of the five-membered or six-membered heterocyclic compound employed, the temperatures employed, the nature and quantity of the water-binding agent employed, if any, the time of reaction and the methods of isolation and purification of the dyes, the following examples will serve to illustrate the mode of obtaining our new dyes. These examples are not intended to limit our invention.

EXAMPLE 1.—*3-ethyl-5-[(1-ethyl-2(1)-β-naphthothiazylidene)-isopropylidene]-rhodanine*

2.69 g. (1 mol.) of 2-acetylmethylene-1-ethyl-β-naphthothiazoline and 1.61 g. (1 mol.) of 3-ethylrhodanine were refluxed for about 20 minutes in 15 cc. acetic anhydride. The dye separated from the chilled reaction mixture after several days standing at 0° C. The crude dye was twice recrystallized from glacial acetic acid and was obtained in the form of green needles, melting at 251–253° C. with decomposition. This dye has the following formula:

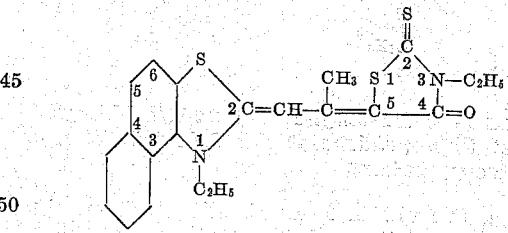

EXAMPLE 2.—*5-[(1-ethyl-2(1)-β-naphthothiazylidene)-isopropylidene]-rhodanine*

2.69 g. (1 mol.) of 2-acetylmethylene-1-ethyl-β-naphthothiazoline and 1.33 g. (1 mol.) of rhodanine were refluxed in 15 cc. of acetic anhydride for about 15 minutes. The dye separated from the chilled reaction mixture after standing several days at 0° C. After recrystallization from glacial acetic acid, the dye was obtained as a very dark crystalline powder, melting at 264–265° C. with decomposition. This dye has the following formula:

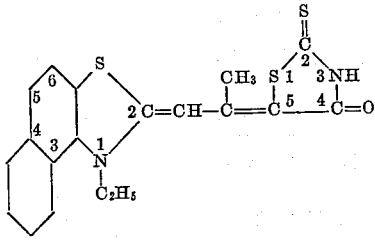

EXAMPLE 3.—*3-phenyl-5-[(1-ethyl-2(1)-β-naphthothiazylidene)-isopropylidene]-rhodanine*

2.69 g. (1 mol.) of 2-acetylmethylene-1-ethyl-β-naphthothiazoline and 2.09 g. (1 mol.) of 3-phenylrhodanine were refluxed in 15 cc. acetic anhydride for about 15 minutes. The dye separated from the chilled reaction mixture after standing about 4 days at 0° C. After recrystallization from glacial acetic acid, the dye was obtained as green crystals melting at 299–300° C. with decomposition. This dye has the following formula:

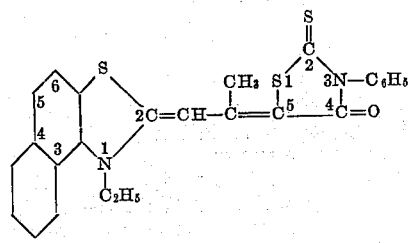

EXAMPLE 4.—*3-ethyl-5-[(1-ethyl-2(1)-β-naphthothiazylidene)-isopropylidene]-2-thio-2,4(3,5)-oxazoledione*

2.69 g. (1 mol.) of 2-acetylmethylene-1-ethyl-β-naphthothiazoline and 1.45 g. (1 mol.) of 3-ethyl-2-thio-2,4(3,5)-oxazoledione were refluxed for about 20 minutes in 15 cc. of acetic anhydride. The dye separated from the chilled reaction mixture after four days standing at 0° C. The dye was recrystallized from glacial acetic acid and obtained as reddish crystals melting at 254–256° C. This dye has the following formula:

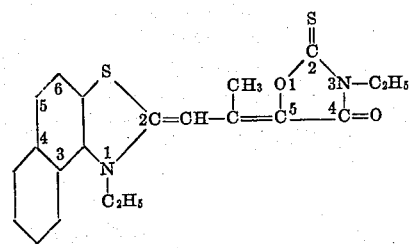

EXAMPLE 5.—*5-[(1-ethyl-2(1)-β-naphthothiazylidene)-isopropylidene]-2-thio-2,4,6-triketohexahydro-pyrimidine*

2.69 g. (1 mol.) of 2-acetylmethylene-1-ethyl-β-naphthothiazoline and 1.44 g. (1 mol.) of thiobarbituric acid were refluxed in 15 cc. of acetic anhydride for about 30 seconds. The dye separated from the reaction mixture chilled to 0° C. After two recrystallizations from pyridine, the dye was obtained as minute orange crystals melting at 301–302° C. with decomposition. This dye has the following formula:

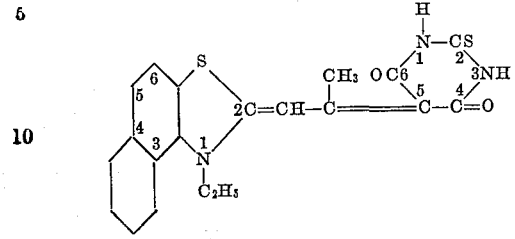

EXAMPLE 6.—*3-phenyl-5-[(ethyl-2(1)-β-naphthothiazylidene)-α-ethyl-ethylidene]rhodanine*

2.83 g. (1 mol.) of 1-ethyl-2-propionylmethylene-β-naphthothiazoline and 2.09 g. (1 mol.) of 3-phenylrhodanine were refluxed in 15 cc. of acetic anhydride for about 30 minutes. The dye separated from the cooled reaction mixture after several days standing at 0° C. The crude dye was twice recrystallized from glacial acetic acid and obtained as green crystals melting at 266–268° C. with decomposition. This dye has the following formula:

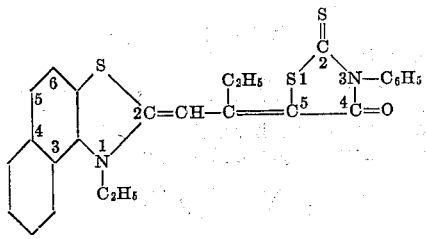

EXAMPLE 7.—*3-ethyl-5-[(2-ethyl-1(2)-benzothiazylidene)-isopropylidene]-2-thio-2,4(3,5)-oxazoledione*

2.19 g. (1 mol.) of 1-acetylmethylene-2-ethyl-benzothiazoline and 1.45 g. (1 mol.) of 3-ethyl-2,4(3,5)-oxazoledione were refluxed in 25 cc. of acetic anhydride for 45 minutes. The dye separated from the cooled reaction mixture which had been diluted with ether after 2 days standing at 0° C. The crude dye was recrystallized from glacial acetic acid and obtained as minute light orange crystals melting at 206–207° C. with decomposition. This dye has the following formula:

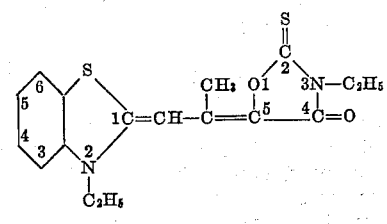

EXAMPLE 8.—*5-[(2-ethyl-1(2)-benzothiazylidene)-isopropylidene]-2-thio-2,4,6-triketohexahydropyrimidine*

2.19 g. (1 mol.) of 1-acetylmethylene-2-ethyl-benzothiazoline and 1.4 g. (1 mol.) of thiobarbituric acid were refluxed in 25 cc. of acetic anhydride for about 30 seconds. The dye separated from the cooled reaction mixture at 0° C. After recrystallization twice from pyridine, the dye was obtained as minute light-orange crystals melting at 332–334° C. with decomposition. This dye has the following formula:

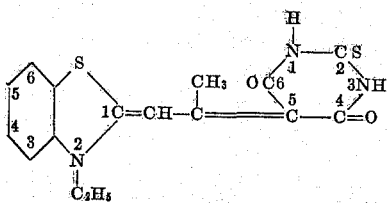

EXAMPLE 9.—5-[(2 - ethyl - 1(2) -benzoselenazylidene) -isopropylidene]-3-phenylrhodanine 2.09 g. (1 mol.) of 3-phenylrhodanine and 2.66 g. (1 mol.) of 1-acetylmethylene-2-ethylbenzoselenazoline were heated together in 15 cc. of acetic anhydride at the refluxing temperature for about 10 minutes. The dye separated from the reaction mixture upon chilling to 0° C. The crude dye was treated with hot ethyl acetate to remove unchanged 3 - phenylrhodanine. The ethyl acetate-treated dye was twice recrystallized from glacial acetic acid and obtained as dull purplish crystals melting at 272° to 273° C. with decomposition. This dye has the following formula:

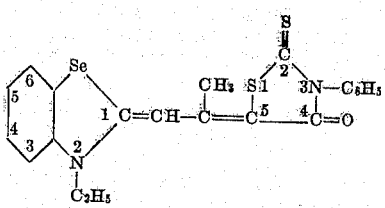

The above illustrations are believed to represent the more useful types of our new dyes and to represent those which are more readily obtainable by our process.

In a manner like that illustrated in the above examples other heterocyclic compounds containing a nuclear reactive methylene group, such as heterocyclic compounds containing the following nuclear grouping:

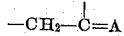

wherein A represents an atom, such as oxygen or sulfur, can be condensed with arylothiazoline and aryloselenazoline compounds. Examples of heterocyclic compounds other than those illustrated in the above examples which can be employed to prepare particularly useful dyes by our new process are: 3-aminorhodanine, 3-carbethoxymethylrhodanine, 3 - (p - dimethylaminophenyl)-rhodanine, 3-allylrhodanine, 3-(β-hydroxyethyl) - rhodanine, 3 - methylrhodanine, 3-(n-propyl) - 2-thio-2,4(3,5)-oxazoledione and 3-methyl-2-thiobarbituric acid.

In the above examples diluents can be added to the reaction mixtures along with the water-binding agent, although this procedure is ordinarily not to be preferred.

The arylothiazoline and aryloselenazoline compounds can be prepared from arylothiazole and aryloselenazole quaternary salts containing a reactive methyl group by condensing the quaternary salts with acyl halides, advantageously in the presence of an acid-binding agent. Such a method is fully described in our copending application Serial No. 29,916, filed July 5, 1935 (now United States Patent 2,112,139, dated March 22, 1938). Also see British Patent 466,269.

Cyclammonium β-ethoxyethyl, β-carbethoxyethyl, β-acetoxyethyl, β-carbethoxymethyl, acetonyl as well as other substituted-alkyl quaternary salts containing a reactive methyl group are described in a copending application of Leslie G. S. Brooker and Lloyd A. Smith, Serial No. 180,214, filed of even date herewith (now United States Patent 2,231,658 dated February 11, 1941). Cyclammonium benzyl quaternary salts containing a reactive methyl group are described in a copending application of Leslie G. S. Brooker and Lloyd A. Smith, Serial No. 175,686, filed November 20, 1937 (now United States Patent 2,233,511, dated March 4, 1941). These quaternary salts, of course, can be converted into acylmethylene derivatives of arylothiazolines and, aryloselenazolines according to the process in our copending application Serial No. 29,916 and the acylmethylene derivatives applied to the preparation of our new dyes as described herein.

What we claim as our invention and desire to be secured by Letters Patent of the United States is:

1. A dye characterized by the following formula:

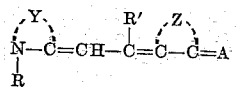

wherein A represents an atom selected from the group consisting of oxygen and sulfur, R represents an alkyl group, R' represents an organic residue selected from the group consisting of alkyl groups and aryl groups, Y represents the non-metallic atoms necessary to complete a nucleus selected from the group consisting of benzothiazole, benzoselenazole, naphthothiazole and naphthoselenazole nuclei and Z represents the non-metallic atoms necessary to complete a nucleus selected from the group consisting of five-membered and six-membered heterocyclic nuclei.

2. A dye characterized by the following formula:

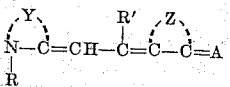

wherein A represents an atom selected from the group consisting of oxygen and sulfur, R represents an alkyl group, R' represents an alkyl group, Y represents the non-metallic atoms necessary to complete a naphthothiazole nucleus, and Z represents the non-metallic atoms necessary to complete a nucleus selected from the group consisting of five-membered and six-membered heterocyclic nuclei.

3. A dye characterized by the following formula:

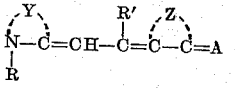

wherein A represents an atom selected from the group consisting of oxygen and sulfur, R represents an alkyl group, R' represents an alkyl group, Y represents the non-metallic atoms necessary to complete a β-naphthothiazole nucleus, and Z represents the non-metallic atoms necessary to complete a nucleus selected from the group consisting of five-membered and six-membered heterocyclic nuclei.

4. A dye characterized by the following formula:

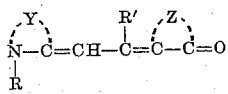

wherein R represents an alkyl group, R' represents an alkyl group, Y represents the nonmetallic atoms necessary to complete a β-naphthothiazole nucleus and Z represents the nonmetallic atoms necessary to complete a rhodanine nucleus.

5. A dye characterized by the following formula:

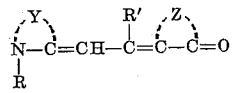

wherein R represents an alkyl group, R' represents an alkyl group, Y represents the nonmetallic atoms necessary to complete a β-naphthothiazole nucleus and Z represents the nonmetallic atoms necessary to complete a 2,4,6-triketohexahydropyrimidine nucleus.

6. A dye characterized by the following formula:

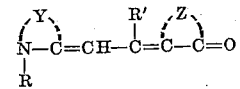

wherein R represents an alkyl group, R' represents an alkyl group, Y represents the nonmetallic atoms necessary to complete a benzothiazole nucleus and Z represents the non-metallic atoms necessary to complete a 2-thio-2,4(3,5)-oxazoledione nucleus.

7. A 3-phenyl-5-[(1-alkyl-2(1)-β-naphthothiazylidene)-isopropylidene]-rhodanine.

8. 3-phenyl - 5 - [(1-ethyl-2(1)-β-naphthothiazylidene)-isopropylidene]-rhodanine.

9. 3-ethyl-5-[(1 - ethyl - 1(2) - benzothiazylidene)-isopropylidene]-2-thio - 2,4(3,5) - oxazoledione.

10. 5-[(1-ethyl-2(1)-β-naphthothiazylidene)-isopropylidene]- 2-thio-2,4,6 - triketohexahydropyrimidine.

11. A process for the preparation of a merocarbocyanine dye comprising reacting, in the presence of a water-binding agent, a heterocyclic compound selected from the group of five-membered and six-membered heterocyclic compounds containing a nuclear reactive methylene group adjacent to a nuclear group selected from the group consisting of nuclear carbonyl or thiocarbonyl groups, with a compound of the following formula:

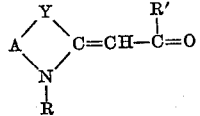

wherein A represents a divalent organic group selected from the group consisting of vinylene and phenylene groups, R represents an alkyl group, R' represents a monovalent organic group selected from the group consisting of alkyl and aryl groups and Y represents a divalent atom selected from the group consisting of oxygen and sulfur.

12. A process for the preparation of a merocarbocyanine dye comprising reacting, in the presence of an aliphatic organic acid anhydride water-binding agent, a heterocyclic compound selected from the group of five-membered and six-membered heterocyclic compounds containing a nuclear reactive methylene group adjacent to a nuclear group selected from the group consisting of nuclear carbonyl or thiocarbonyl groups, with a compound of the following formula:

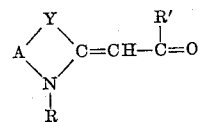

wherein A represents a divalent organic group selected from the group consisting of vinylene and phenylene groups, R represents an alkyl group, R' represents a monovalent organic group selected from the group consisting of alkyl and aryl groups and Y represents a divalent atom selected from the group consisting of oxygen and sulfur.

13. A process for the preparation of a merocarbocyanine dye comprising reacting, in the presence of a propionic anhydride water-binding agent, a heterocyclic compound selected from the group of five-membered and six-membered heterocyclic compounds containing a nuclear reactive methylene group adjacent to a nuclear group selected from the group consisting of nuclear carbonyl or thiocarbonyl groups, with a compound of the following formula:

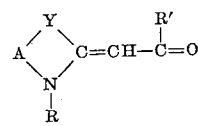

wherein A represents a divalent organic group selected from the group consisting of vinylene and phenylene groups, R represents an alkyl group, R' represents a monovalent organic group selected from the group consisting of alkyl and aryl groups and Y represents a divalent atom selected from the group consisting of oxygen and sulfur.

LESLIE G. S. BROOKER.
FRANK L. WHITE.